(12) United States Patent
Muncaster et al.

(10) Patent No.: US 7,164,579 B2
(45) Date of Patent: Jan. 16, 2007

(54) MOUNTING DEVICE FOR A DISK DRIVE UNIT, RELEASABLE FASTENER AND METHOD OF TESTING A DISK DRIVE UNIT

(75) Inventors: Timothy John Muncaster, Ryde (GB); William Albert Saville, Wickham (GB)

(73) Assignee: Xyratex Technology Limited, Hampshire (GB)

( * ) Notice: Subject to any disclaimer, the term of this patent is extended or adjusted under 35 U.S.C. 154(b) by 76 days.

(21) Appl. No.: 10/517,189

(22) PCT Filed: Jul. 1, 2003

(86) PCT No.: PCT/GB03/02826

§ 371 (c)(1),
(2), (4) Date: Dec. 7, 2004

(87) PCT Pub. No.: WO2004/006260

PCT Pub. Date: Jan. 15, 2004

(65) Prior Publication Data

US 2005/0219809 A1 Oct. 6, 2005

Related U.S. Application Data

(60) Provisional application No. 60/393,292, filed on Jul. 5, 2002.

(51) Int. Cl.
*H05K 7/20* (2006.01)

(52) U.S. Cl. .................. 361/685; 361/695; 361/724; 324/73.1; 385/158.1

(58) Field of Classification Search ............. 361/685, 361/687, 694, 695, 697, 724–727, 739, 749, 361/755; 257/785, 788; 454/184; 324/73.1, 324/158.1, 537, 760; 312/223.1, 223.2, 111, 312/204, 265.6, 332.1, 348.1, 348.6; 174/52.1; 62/259.2; 360/97.02; 73/865.6, 865.8, 865.9
See application file for complete search history.

(56) References Cited

U.S. PATENT DOCUMENTS 5,127,684 A 7/1992 Klotz et al.
5,171,183 A * 12/1992 Pollard et al. ............... 454/184

(Continued)

FOREIGN PATENT DOCUMENTS

EP 0 635 836 A1 1/1995

(Continued)

*Primary Examiner*—Michael Datskovskiy
(74) *Attorney, Agent, or Firm*—Pillsbury Winthrop Shaw Pittman LLP

(57) ABSTRACT

A disk drive unit mounting device is adapted to carry one or plural disk drive units. The mounting device includes a temperature control module and a carrier module secured together y a releasable fastener device so that the temperature control module controls the temperature of the disk drive unit. The temperature control module has an air flow control device for controlling the flow of air across the disk drive unit appropriately according to the required temperature for the disk drive unit. The mounting device may be used in testing disk drive units.

23 Claims, 14 Drawing Sheets

U.S. PATENT DOCUMENTS

| | | |
|---|---|---|
| 5,912,799 A | 6/1999 | Grouell et al. |
| 6,069,792 A * | 5/2000 | Nelik .......................... 361/687 |
| 6,124,707 A * | 9/2000 | Kim et al. ............... 324/158.1 |
| 6,144,553 A * | 11/2000 | Hileman et al. ............ 361/687 |
| 6,231,145 B1 * | 5/2001 | Liu .......................... 312/332.1 |
| 6,236,563 B1 | 5/2001 | Buican et al. |
| 6,480,382 B1 * | 11/2002 | Cheng ........................ 361/695 |
| 6,535,384 B1 * | 3/2003 | Huang ........................ 361/695 |
| 6,628,518 B1 * | 9/2003 | Behl et al. .................. 361/687 |
| 6,806,700 B1 * | 10/2004 | Wanek et al. ............ 324/158.1 |
| 2001/0046118 A1 | 11/2001 | Yamanashi et al. |

FOREIGN PATENT DOCUMENTS

| | | |
|---|---|---|
| WO | WO 89/01682 A1 | 2/1989 |
| WO | WO 00/49487 A1 | 8/2000 |
| WO | WO 01/41148 | 6/2001 |

* cited by examiner

MOUNTING DEVICE FOR A DISK DRIVE UNIT, RELEASABLE FASTENER AND METHOD OF TESTING A DISK DRIVE UNIT

This is the U.S. National Phase of International Application No. PCT/GB2003/002826, filed Jul. 1, 2003, and also claims benefit of priority to U.S. Provisional Application No. 60/393,292, filed Jul. 5, 2002, the contents of both of which are hereby incorporated by reference in their entireties.

The present invention relates to a mounting device for a disk drive unit, to a releasable fastener and to a method of testing a disk drive unit.

During manufacture of disk drive units, it is necessary to test the disk drive units to ensure that they meet the required specification. As part of the testing operation, it is necessary to control the temperature of the disk drive units. The temperature of the disk drive units is varied across a wide range during testing. In many known testing apparatus, the temperature of plural disk drive units is controlled by using cooling or heating air which is common to all of the disk drive units.

In our WO-A-01/41148, the entire content of which is hereby incorporated by reference, there is disclosed a carrier for a disk drive unit that enables the temperature of the disk drive unit to be controlled during testing or normal operation by the use of a temperature control device that causes air at a required temperature to be passed over the disk drive unit. This arrangement allows the temperature of the disk drive unit to be controlled independently of the temperature of disk drive units mounted in other carriers in a rack containing plural such carriers. While this carrier is valuable, there are certain applications in which it has non-optimal performance. First, the structure of the carrier means that the carrier is dedicated to a particular type and model of disk drive unit, and thus the carrier cannot be used for disk drive units having a different connectivity or configuration. Secondly, in the event of a fault in the carrier itself, the whole carrier must be removed for repair or replacement. Thirdly, the carrier is specifically adapted for housing only one disk drive unit at a time, which means that a test device for a number of disk drive units may be undesirably large.

According to a first aspect of the present invention, there is provided a mounting device for a disk drive unit, the mounting device comprising: a carrier module constructed and arranged to receive at least one disk drive unit, the carrier module having an air input port, the carrier module being arranged to direct air from the air input port over a disk drive unit received in the carrier module; a temperature control module comprising an air flow control device, the temperature control module having an air output port; and, a connection device for releasably fastening the carrier module to the temperature control module with the air input port of the carrier module in register with the air output port of the temperature control module, wherein the temperature control module is arranged to provide air from the air input port for controlling the temperature of a said disk drive unit received in the carrier module to be at a predetermined temperature during operation of the disk drive unit.

By providing a temperature control module, which may have a standard or fixed configuration, together with a carrier module matching that configuration, and a connection device for releasably fastening the two together, one carrier module may be readily interchanged for another. Thus carrier modules may be provided for different types of disk drive unit. A carrier module for one type of disk drive unit may be readily removed from the temperature control module and exchanged for a carrier module for the same or another type of disk drive unit. Carrier modules configured to simultaneously house two or more disk drive units may be provided. The device is particularly useful for carrying one or more disk drive units whilst the or each disk drive unit is being tested during manufacture, though the device can also be used to carry one or more disk drive units during normal use of the disk drive units by an end user.

The air flow control device may include an air-moving device such as a fan, and/or flow control valves together with a device of devices for sensing the temperature of air in the carrier module. A heater may allow the air output from the temperature control module to be heated, and a cooler may allow that air to be cooled before inlet into the carrier module to achieve a desired air temperature in the carrier module.

The mounting device enables the temperature of a disk drive unit in the carrier module to be controlled to be at a predetermined temperature during operation of the disk drive unit. It will be understood that, in practice, the temperature will be controlled to be within certain limits of a predetermined temperature and the phrase "predetermined temperature" shall be construed accordingly.

The mounting device can be located with other similar devices each carrying their own respective disk drive units. In that case, embodiments of the present invention in which each carrier module houses only one disk drive unit allow the temperature of individual disk drive units to be controlled independently. Other embodiments in which two or more disk drive units are housed in a single carrier module allow the temperature of the two or more disk drive units to be controlled together. This in turn means that if for example a rack of plural such mounting devices is being used, disk drive units in the different mounting devices can be at different temperatures at the same time, which is particularly advantageous when used in a test application in that it allows for fully independent testing of the disk drive units including insertion and removal of the disk drive units into respective carriers.

The temperature control module comprises an air flow control device for causing air to flow across a disk drive unit received in the carrier. As will be discussed further below, the air can be for cooling or warming the disk drive unit and/or for keeping the temperature of the disk drive unit constant.

Preferably the carrier module has an air outlet port and the temperature control module has an air inlet port, the arrangement being such that when the connection device fastens the carrier module to the temperature control module the air outlet port of the carrier module is aligned with the air inlet port of the temperature control module.

By providing an air outlet port of the carrier module aligned with the air inlet port of the temperature control module, embodiments of the invention allow for air flow to occur all around a disk drive unit and under controlled conditions. It would of course be possible to exhaust air from the carrier module to the atmosphere, but this has a number of disadvantages. For example, in use the disk drive units generate heat, and where air is extracted by the temperature control module rather than being exhausted, this heat can be employed by recirculating the air during testing to reduce the energy applied by the test device. Another example of a disadvantage of exhausting air is that the control of air flow within the carrier module would be less precise than where a positive extraction occurs.

Advantageously the temperature control module has a fan and is arranged to selectively recirculate air from the air inlet port to the air outlet port.

Recirculation allows for energy to be conserved within the mounting device, by preventing heated or cooled air from being fed into a facility containing the mounting device, and thus reduces environmental loads on that facility.

A heat exchanger may be accessible by the temperature control module for selectively receiving and cooling at least a portion of the air that has passed over a disk drive unit received in the carrier module thereby to provide chilled air, the air flow control device being selectively operable to cause air to recirculate directly across a disk drive unit received in the carrier module, or to cause at least a portion of the air that has passed over a disk drive unit received in the carrier to pass through the heat exchanger to provide chilled air and to cause said chilled air to flow across a disk drive unit received in the carrier module, or to cause a mixture of directly recirculated air and chilled air to flow across a disk drive unit received in the carrier module.

The temperature control module may be selectively operable to cause air to cause fresh air from outside the carrier to flow across a disk drive unit received in the carrier, or to cause a mixture of recirculated air and fresh air from outside the carrier to flow across a disk drive unit received in the carrier.

Typically, causing air to recirculate across a disk drive unit will cause the temperature of the disk drive unit to rise until heat loss from the carrier matches the power consumption of the disk drive unit. Fresh air will normally be at a temperature, which is lower than the temperature of the disk drive unit and thus will tend to cool the disk drive unit. Otherwise, a heat exchanger can be used to provide chilled air. The air flow means can be operated to cause a mixture of recirculated air and fresh or chilled air to flow across the disk drive unit, allowing for intermediate temperatures to be obtained and maintained.

The temperature control module may comprise a selectively operable heater in the air flow path to a disk drive unit received in the carrier module for selectively heating air prior to said air flowing across a disk drive unit received in the carrier module. This allows the temperature of the disk drive unit to be raised or to be raised more quickly than otherwise.

Preferably the connection device comprises a manually releasable hinge pivotally connecting the carrier module and the temperature control module along one edge thereof, and a lever latch for securing the carrier module to the temperature control module along an edge opposite the said one edge.

Although other types of manual connect/release connectors are possible, a manual release hinge allows the carrier and temperature control modules to be connected together and separated without the need for tools. The hinge function allows embodiments to be created in which faces of the modules are not in contact at the time of such connection and separation. The modules can then be mutually pivoted until the faces come into contact, which facilitates connections to be made between them. The use of a lever latch enables embodiments to be created in which the modules are only capable of being locked together when in correct alignment. The tension of the closed lever latch provides resilience, which urges the faces of the modules together. The use of a lever latch also provides a mechanical advantage for drawing together the modules during assembly, and particularly for drawing the electrical connectors of the device into cooperative engagement.

In disassembling the modules, it is an advantage to provide a controlled force to disengage the electrical connectors, if possible damage is to be avoided. In the preferred embodiment, the lever latch further provides this controlled disengaging force.

Preferably, the manually releasable hinge has a pin portion, a receptacle portion and a hook member, the pin portion being secured to and supported substantially parallel to and spaced from a wall of one of said the carrier module and temperature control module, the receptacle portion being formed on the other of the carrier module and the temperature control module, the receptacle portion being constructed and arranged to engage said pin portion, the receptacle portion having a curved wall for abutment by the pin portion and the receptacle formation defining an opening such that the pin portion may be brought into engagement with the curved wall of the receptacle portion via the opening, and the hook member being constructed and arranged to engage the carrier module and the temperature control module to retain the pin portion in engagement with the curved wall of the receptacle portion.

The particular structure allows a hinge to be made which provides accurate self-alignment of the two modules, and which thus facilitates connection of the carrier module to the temperature control module.

Preferably, the carrier module is constructed and arranged to simultaneously receive plural disk drive units.

The ability to use the carrier module simultaneously for two or more disk drive units allows more disk drive units to be accommodated within a certain volume. As two or more disk drive units are subjected to the same conditions in embodiments of the invention using such carrier modules, this enables the performance of disk drive units to be compared with one another.

Advantageously the mounting device has air flow passages for dividing air flow from the output port of the temperature control module for application to each of plural disk drive units received in the carrier module.

Advantageously again the mounting device has air flow passages for combining the air flow from each of plural disk drive units received in the carrier module to provide said outlet from the carrier module.

Preferably the passages are arranged to divide the air flow such that it flows in the same direction around each disk drive unit.

Embodiments of the invention that have such passages allow for precisely the same temperature conditions to be applied to each disk drive.

Preferably the mounting device has a baffle that provides said air flow passages, the baffle having a first side having at least one opening for receiving an incoming air flow from the temperature control module, and a second side having plural openings for supplying air to each of plural disk drive units received in the carrier module, the baffle having a deflection structure constructed and arranged to divide the incoming air flow between said plural disk drive units.

Preferably again, the second side of the baffle has plural further openings for receiving air from the disk drive units and the first side of the baffle has at least one opening for passing said air from the disk drives units to a temperature control module.

Advantageously, at said second side of said baffle, said openings and said further openings are interleaved, whereby each of the plural disk drive units has a similar flow of air.

Advantageously the temperature control module has an electrical connection device, the carrier module has a first electrical connector for engaging a disk drive unit received in the carrier module, and the carrier module has a second electrical connector arranged to engage the electrical connection device of the temperature control module when the temperature control module and the carrier module are fastened together.

In embodiments where plural disk drive units may be simultaneously received in the carrier module, preferably the temperature control module has an electrical connection device, and the carrier module has plural first electrical connectors for engaging respective disk drive units received in the carrier module and a second electrical connector arranged to engage the electrical connection device of the temperature control module when the temperature control module and the carrier module are fastened together.

Where different types of carrier modules are provided, each for a different type of disk drive unit, and each different type of disk drive unit has a differently configured or located electrical connection device, preferably the temperature control module has an electrical connection device, each type of carrier module has a respective first electrical connector and disposed and configured to engage each disk drive unit of a respective type received in the carrier module, and a second electrical connector arranged to engage the electrical connection device of the temperature control module when the temperature control module and any of said types of carrier module are secured together.

Each of the apparatus described above may comprise a controller for independent control of the temperature control modules associated with the disk drive unit carrier modules.

According to a second aspect of the present invention, there is provided a releasable fastener for fastening together first and second members, the fastener comprising a pin portion for mounting on a first member, a receptacle portion for mounting on a second member and a hook member for engagement with a said first and second member, the receptacle portion being constructed and arranged to engage said pin portion, the receptacle portion having a concave curved wall and defining an opening such that the pin portion may be brought into engagement with the curved wall of the receptacle formation via the opening, and the hook member being constructed and arranged to retain the pin portion engaged with the curved wall of the receptacle portion.

Preferably, the arrangement is such that the hook member is under tension when engaged with a said first and second member.

According to a third aspect of the present invention, there is provided a method of testing a disk drive unit in a test device comprising a temperature control module and a carrier module constructed and arranged to support said disk drive unit, wherein the carrier module has an air input port and is arranged to direct air from the air input port over a said disk drive unit received in the carrier module and the temperature control module comprises an air flow control device and has an air output port, the method comprising: releasably fastening the carrier module to the temperature control module, such that the air input port of the carrier module is in register with the air output port of the temperature control module; disposing said disk drive unit in said carrier module; and, causing the temperature control module to provide air from said air output port to said air input port to control the temperature of said disk drive unit disposed in the carrier module to be at a predetermined temperature during operation of the disk drive unit.

The method may comprise the step of controlling the flow of air across the disk drive unit to cause air to recirculate directly across the disk drive unit, or to cause chilled air obtained by passing at least a portion of the air that has passed over the disk drive unit through a heat exchanger to flow across the disk drive unit, or to cause a mixture of directly recirculating air and chilled air to flow across the disk drive unit.

The method may comprise the step of, independently for each disk drive unit, controlling the flow of air across the disk drive unit to cause air to recirculate across the disk drive unit, or to cause fresh air to flow across the disk drive unit, or to cause a mixture of recirculated air and fresh air to flow across the disk drive unit.

In an advantageous embodiment, the temperature control module and the carrier module each have a respective part of an manual release hinge and the step of releasably fastening comprises engaging the two parts of a said hinge, mutually pivotally moving the carrier module and the temperature control module until they abut one another and securing the carrier module to the temperature control module via a lever latch.

In a preferred embodiment, the carrier module has locations constructed and arranged to simultaneously receive plural disk drive units, and the disposing step comprises disposing at least two disk drive units in respective ones of said locations.

Advantageously the method comprises dividing air flow from the outlet of the temperature control module and applying a part of said divided air flow to each of plural disk drive units received in the carrier module, and combining the air flow from each of the disk drive units to provide said outlet from the carrier module.

Preferably the dividing step comprises dividing the air flow such that it flows in the same direction around each disk drive unit.

In a preferred embodiment, the method comprises providing plural types of carrier module, each type of module being suitable for a respective one of plural different types of disk drive unit.

In some embodiments the temperature control module has an electrical connection device, the carrier module has a first electrical connector secured thereto for engaging a disk drive unit received in the carrier module, and a second electrical connector arranged to engage the electrical connection device of the temperature control module when the temperature control module and the carrier module are secured together, and said step of disposing comprises connecting the electrical connection device of the disk drive unit to said first electrical connector.

In preferred embodiments each of said different types of disk drive unit has an electrical connection device which is at least one of differently disposed or differently configured to electrical connection devices of others of said types of disk drive units, the temperature control module has an electrical connection device, each type of carrier module has a respective first electrical connector secured thereto for engaging the electrical connection device of the corresponding type of disk drive unit received in the carrier module, and a second electrical connector arranged to engage the electrical connection device of the temperature control module when the temperature control module and the carrier module are secured together, and said step of disposing comprises connecting the electrical connection device of the disk drive unit to said first electrical connector.

Embodiments of the present invention will now be described by way of example with reference to the accompanying drawings, in which.

Figure 1:
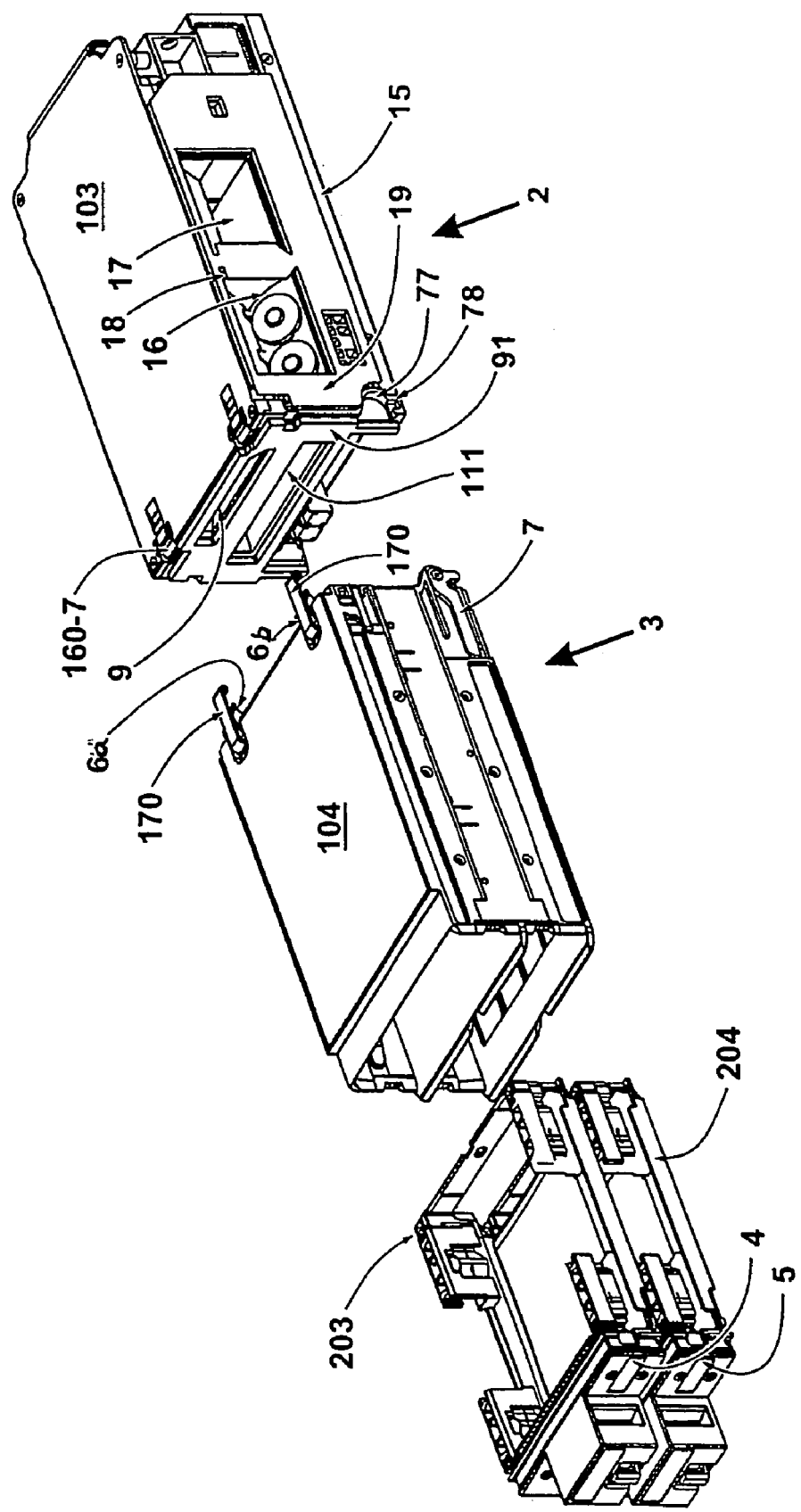
FIG. 1 is an exploded perspective view of an example of a mounting device for a disk drive unit in accordance with one aspect of the present invention.

Referring to FIG. 1, a mounting device 1 for a disk drive unit has a first module 2 secured to a second module 3, the two modules 2,3 being secured end-to-end. The modules 2,3 are each of box-like construction and generally of rectangular section. The first module is a temperature control module 2 and the second is a carrier module 3 for, in this example, two disk drive units 102,202 (see FIG. 2) carried in disk drive unit supports 203,204. The carrier module 3 has an air input port 130 (see FIG. 5) in the end that engages the temperature control module 2, and includes walls 138–145 (see FIG. 8) forming a baffle defining air flow passages for directing air from the input port 130 over the disk drive units 102,202 disposed within the carrier module. The temperature control module 2 includes an air control device, including in this example a centrifugal fan 105 (see FIG. 3) and mode controller 260 (see FIG. 3), and has an air output port 9. The air output port 9 is in the rectangular end wall 90 that abuts the carrier module 3. The carrier module also has a generally rectangular end wall 28, best seen in FIG. 5, the arrangement being that the end walls 28,90 sealingly abut one another when the modules 2,3 are secured together.

Referring to FIG. 1, the temperature control module 2 also has an air inlet port 111. The carrier module 3 has an air outlet port 131a–131c (see FIG. 5), the inlet 111 and outlet 131a–131c ports being aligned when the modules are secured together.

A connection device, also referred to as a "releasable fastener," secures the modules together in a releasable fashion, so that the air input port 130 is aligned with the air output port 9. The connection device of this embodiment includes a pair of manual release hinges 6a, 6b, a pair of tension straps 170 and a pair of lever latches 7. It is desirable to have fastenings that enable rapid connection and disconnection of the two modules 2,3, preferably without the need for tools, and the connection device of this embodiment allows these desiderata to be met.

Figure 11:
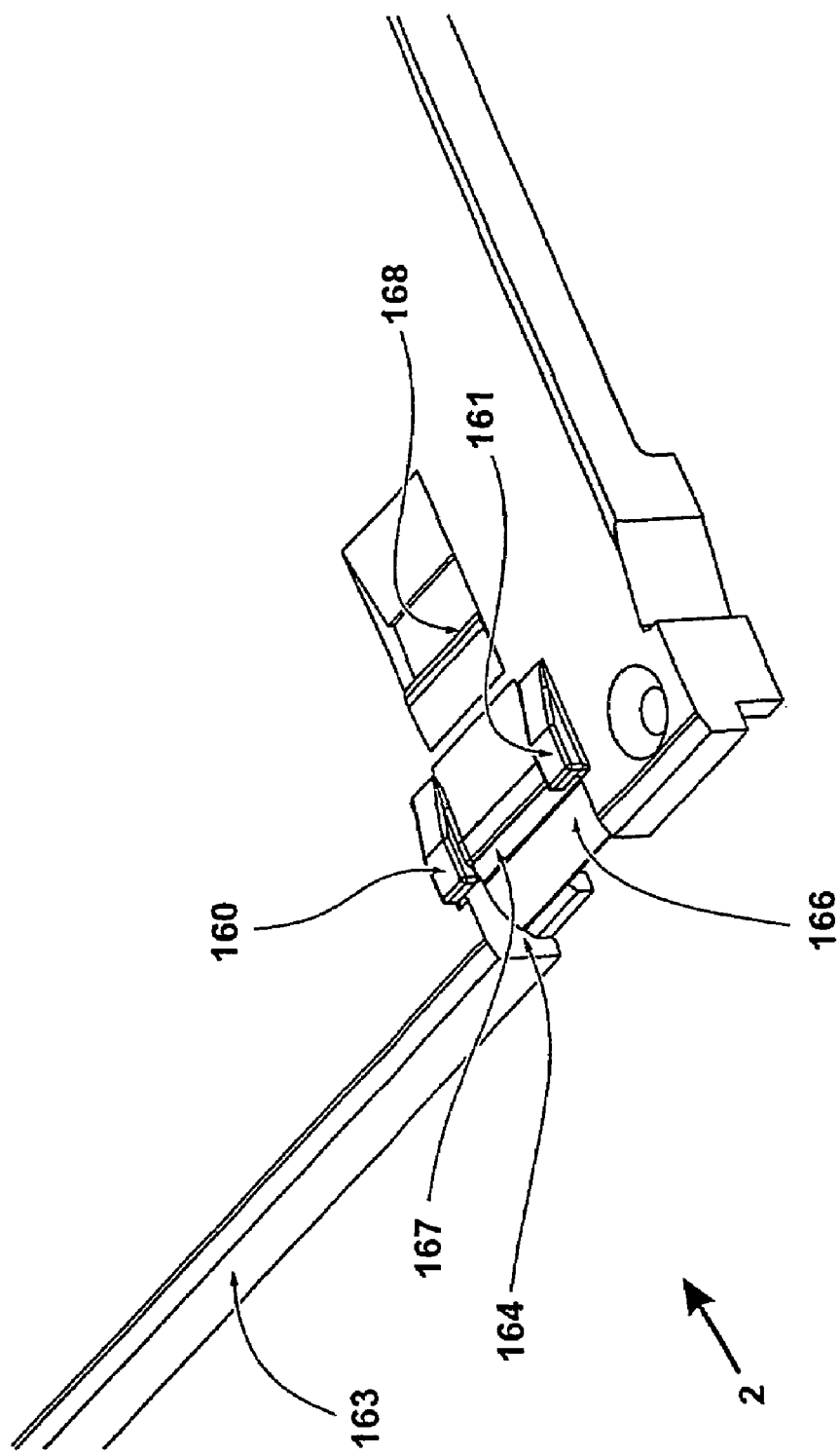
FIG. 11 is a partial view of the carrier module of FIG. 1 showing the receptacle portion of the manual release hinge.

The temperature control module 2 has a top wall 103 which has forms receptacle portions 16-7 of the manual release hinges 6a, 6b (see FIG. 11). The temperature control module 2 also has opposing side walls 15 that at their lower front portions define engagement points 77,78 for the lever latches 7. At the end portions of the side walls 15 of the temperature control module 2, and above the engagement points 77, 78, the walls 15 have a corrugated portion 19 to enable a reduced thickness of material to be used.

The carrier module 3 has a top wall 104, which at its rear has pin portions 150-2 (see FIG. 10) of the manually released hinges 6a, 6b, as counterpart formations to the receptacle parts in the top wall 103 of the temperature control module 2. The top wall 104 of the carrier module 3 is engaged by one end of the tension straps 170 which allow linkage of the carrier and temperature control modules 2,3. The manually released hinges 6a, 6b enable releasable fastening of the temperature control module 2 to the carrier module 3, final securing of the two being via the lever latches 7 at the lower parts of the sides of the two modules 2,3. The final securing is under tension of the tension straps, which thereby prevents vibrations to be prevented.

It would of course be possible to provide instead other connection devices, for example aligning pins projecting from one of the modules and mating holes or recesses in the other, and a clip or latch for maintaining the desired sealing connection.

As will be further described later herein, the temperature control module 2 controls the temperature of the disk drive units 102,202 to be at a predetermined temperature during operation of the disk drive units 102,202. Operation of the disk drive unit 102, 202 includes operation during testing of the disk drive units 102, 202.

Figure 5:
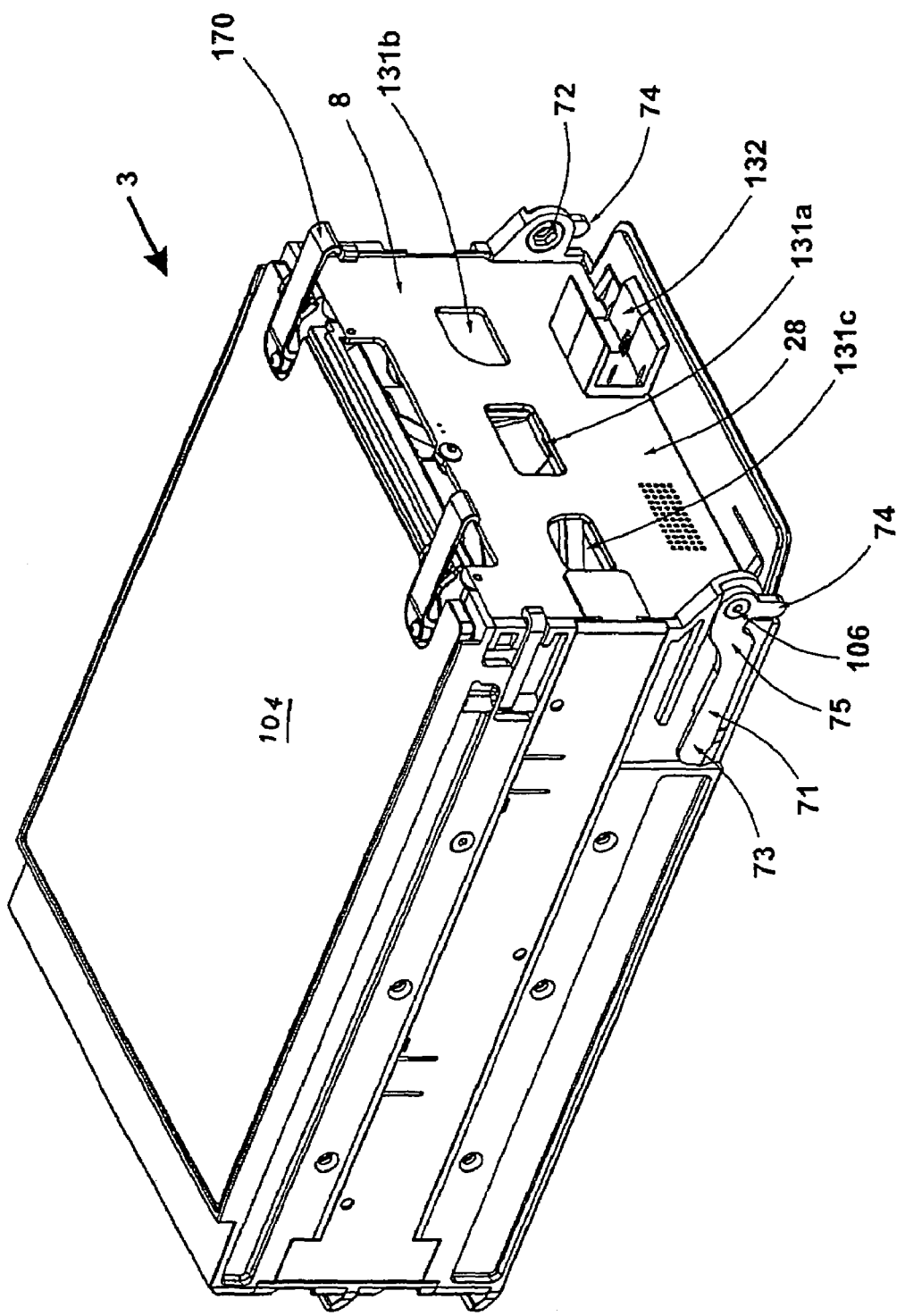
FIG. 5 is a rear perspective view of the carrier module of the device of FIG. 1.

As will also be seen in FIG. 5, an interface unit 8 forming the rear wall of the carrier module 3 is provided at the rear of the carrier module 3. The interface unit 8 allows for electrical connection between the temperature control module 2 and the disk drive units 102,202. The interface unit 8 also has the walls 138–145 that define the air passages for conducting air between the temperature control module 2 and the surfaces of the disk drive units 102,202, as will be later described herein.

The carrier module 3 has mechanical latches 4,5 at the front which can be released to allow two disk drive units 102,202 to be inserted into or removed from the carrier module 3. The disk drive units 102,202 will typically be a complete unit having one or more rotatable magnetic disks on which data can be stored, one or more read/write heads mounted on one or more read/write arms, at least one motor for moving the arm or arms, and appropriate internal electrical connections. In the described embodiment used for testing, the mechanical latches 4,5 are operable by a mechanical handling device for loading disk drive units 102,202 for testing and unloading disk drive units 102,202 when tested.

Figure 2:
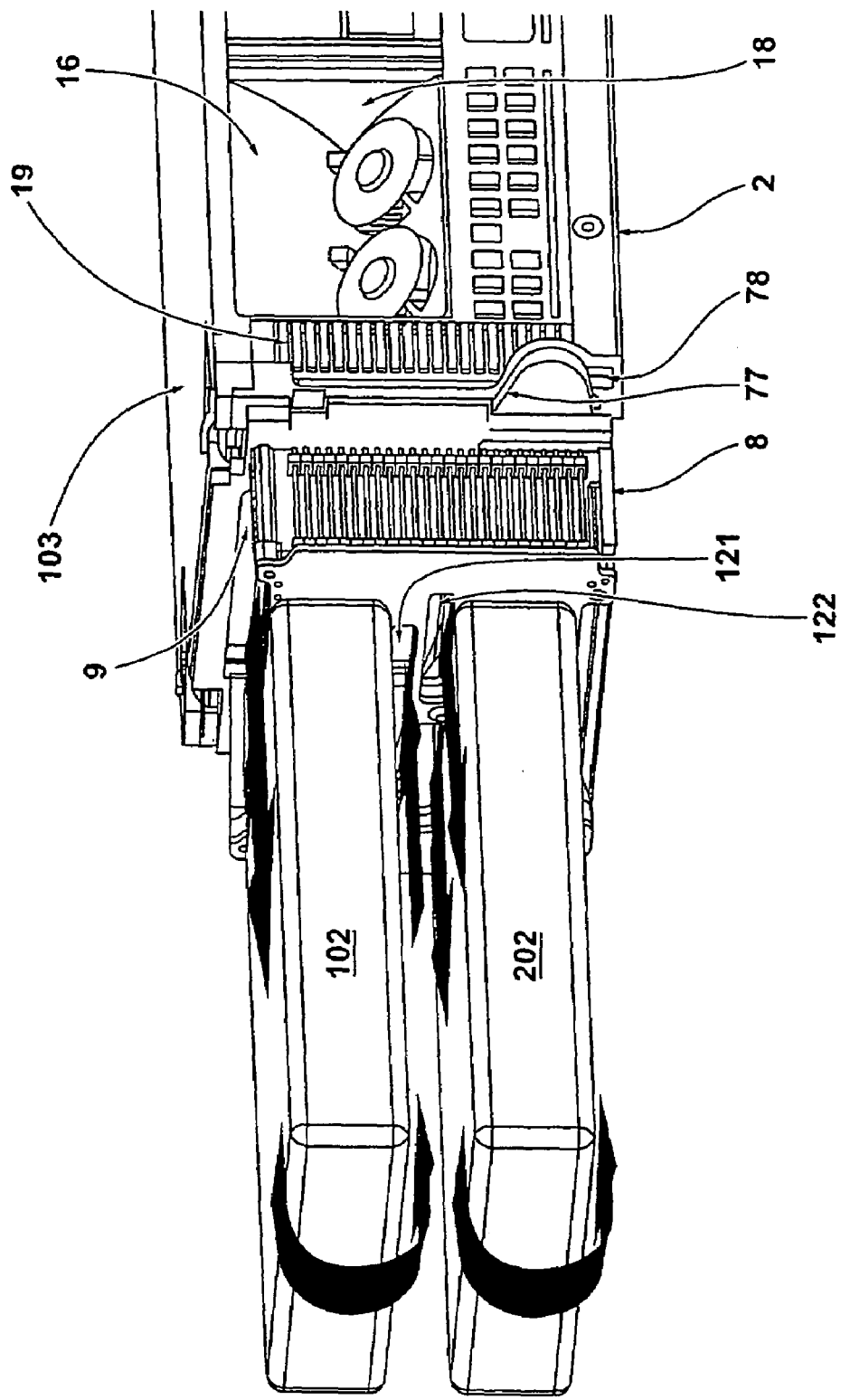
FIG. 2 is a perspective view of a part of the device of FIG. 1, with parts removed for clarity.

The location of the disk drive units 102, 202 in the carrier module 3 is best seen in FIG. 2.

The disk drive units 102,202 are disposed one above the other, and are engaged both mechanically and electrically with the interface unit 8 with openings of the interface unit providing air flow over the disk drive units 102,202. In this embodiment, air flow is in the same sense around each of the two disk drive units 102,202. To that end the interface unit has an upper edge 108 over which air flows to the upper side 109 of the upper disk drive unit 102 and a lower recessed edge 120 for return of air from the lower surface 210 of the lower disk drive unit 202. There are also three central slots 121-3, of which one 121 forms a return for air from the lower surface 110 of the upper disk drive unit 102. The other two slots 122,123 are disposed side by side and below the first slot 121 to provide flow over the upper surface 209 of the lower disk drive unit 202.

Figure 3:
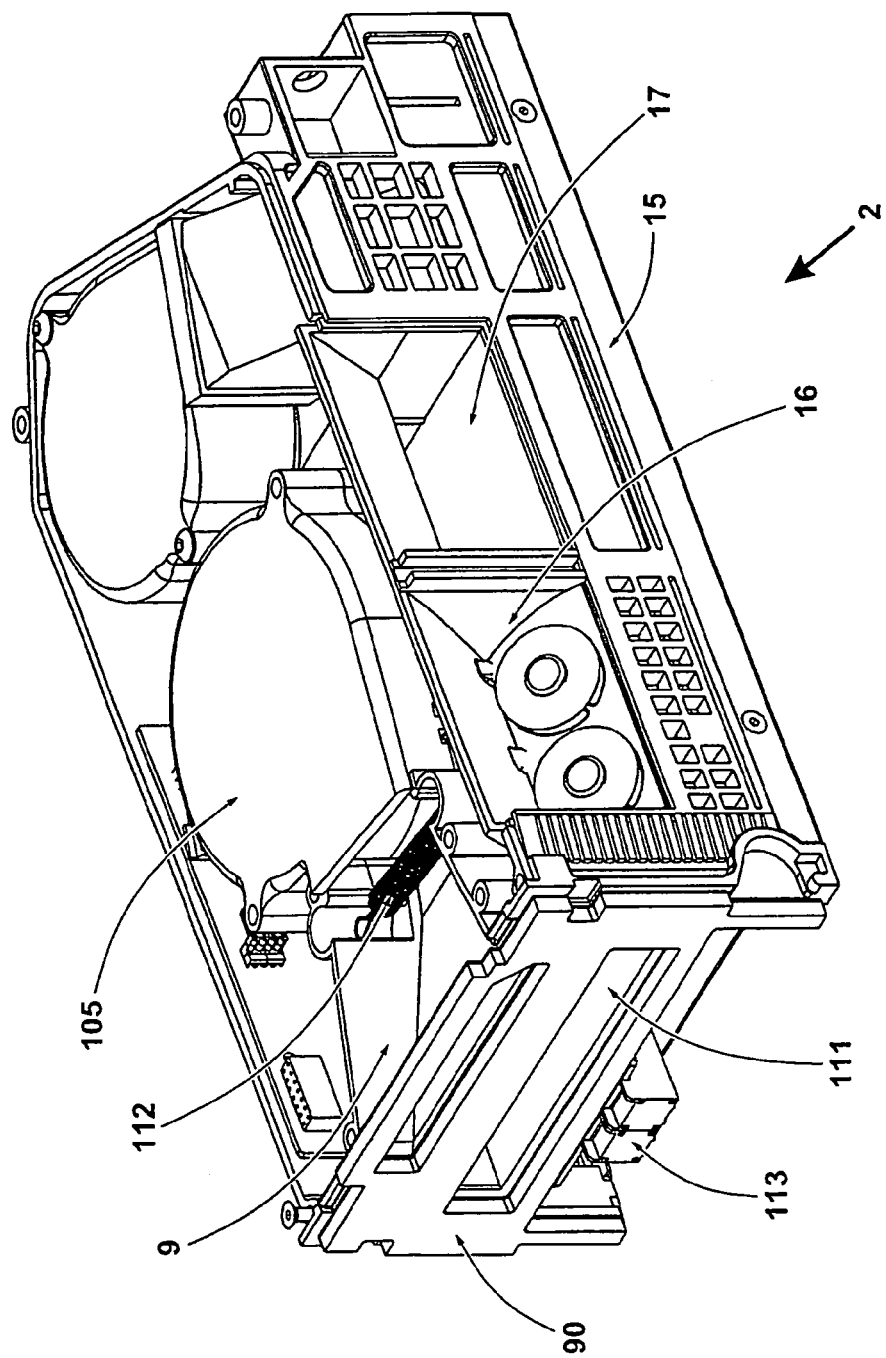
FIG. 3 is a perspective view of the temperature control module of the device of FIG. 1 with covers and parts removed for clarity.

Referring to FIG. 3, the temperature control module 2 is, as has previously been described, a generally box-like structure with a rectangular section, and has a generally rectangular end wall 90. The wall 90 defines a generally central slot-like air inlet 111 from the interface unit 8 of an attached carrier module 3, and in combination with the top wall 103, defines an air outlet 9 to such an interface unit 8. Below the slot-like air intake 111 is a recess 91, which houses electrical connectors 113. The electrical connectors 113 are sockets and serve to carry signals from a base unit (not shown) to which the rear face of the temperature control module 2 is mounted, and disk drive units 102,202 mounted to a carrier module 3 connected to the temperature control module 3. The base unit may include a support framework for several temperature control modules, together with cooling devices, power supplies and test computers. Internally, the temperature control module 2 has an air flow control device that includes a centrifugal fan 105 that rotates about a vertical axis in the orientation shown in the drawings. It would alternatively be possible to use other types of fan, such as an axial fan or indeed a compressor. In the present embodiment, the air flow control device also includes a mode controller 260 which routes the air flow differently according to the test conditions required. The mode controller here allows for air to be simply recirculated with no added or removed heat, to be recirculated with added heat or to be cooled by diversion through a cooling device, in the manner described in our patent application WO-A-01/41148. In the present embodiment, the mode controller is a baffle 260 in the form of an upstanding semi-circular wall which can be pivoted about a vertical axis by a motor 268, also as described in our co-pending patent application WO-A-01/41148. However, other devices such as blend doors, or valves could be used instead.

Although not shown, the temperature control module 2 of the currently described embodiment, in which the mounting device is used to test disk drive units 102,202, includes a processing device operated as an embedded processor to run programs that provide testing routines and regimes for disk drive units 102,202 in the associated carrier module 3. This arrangement enables communication between a main processor and the individual disk drive units 102,202 to be much less than would be needed if the main processor were directly controlling the disk drive units 102,202.

The centrifugal fan 105 is contained within a generally circular housing 10 which directs the air flow exiting the fan 105 towards an air output port 9 of the temperature control module 3. The air inlet 111 is to the inlet side of the fan 105, at the centre of its lower side and the fan 105 has a generally tangential air outlet 12 at its upper side and directed towards the air output port 9. A heater coil 112 is disposed across the fan outlet; the function of this will be later described herein.

Two portions of a side wall 15 of the temperature control module 2 are absent towards the rear of the temperature control module 2 to provide two adjacent openings 16,17 in the side wall 15 at a position near the fan 105. The side wall 15 has a short wall portion 18 between the openings 16,17 that is directed generally inwardly of the carrier 1 towards the fan 105.

Figure 4:
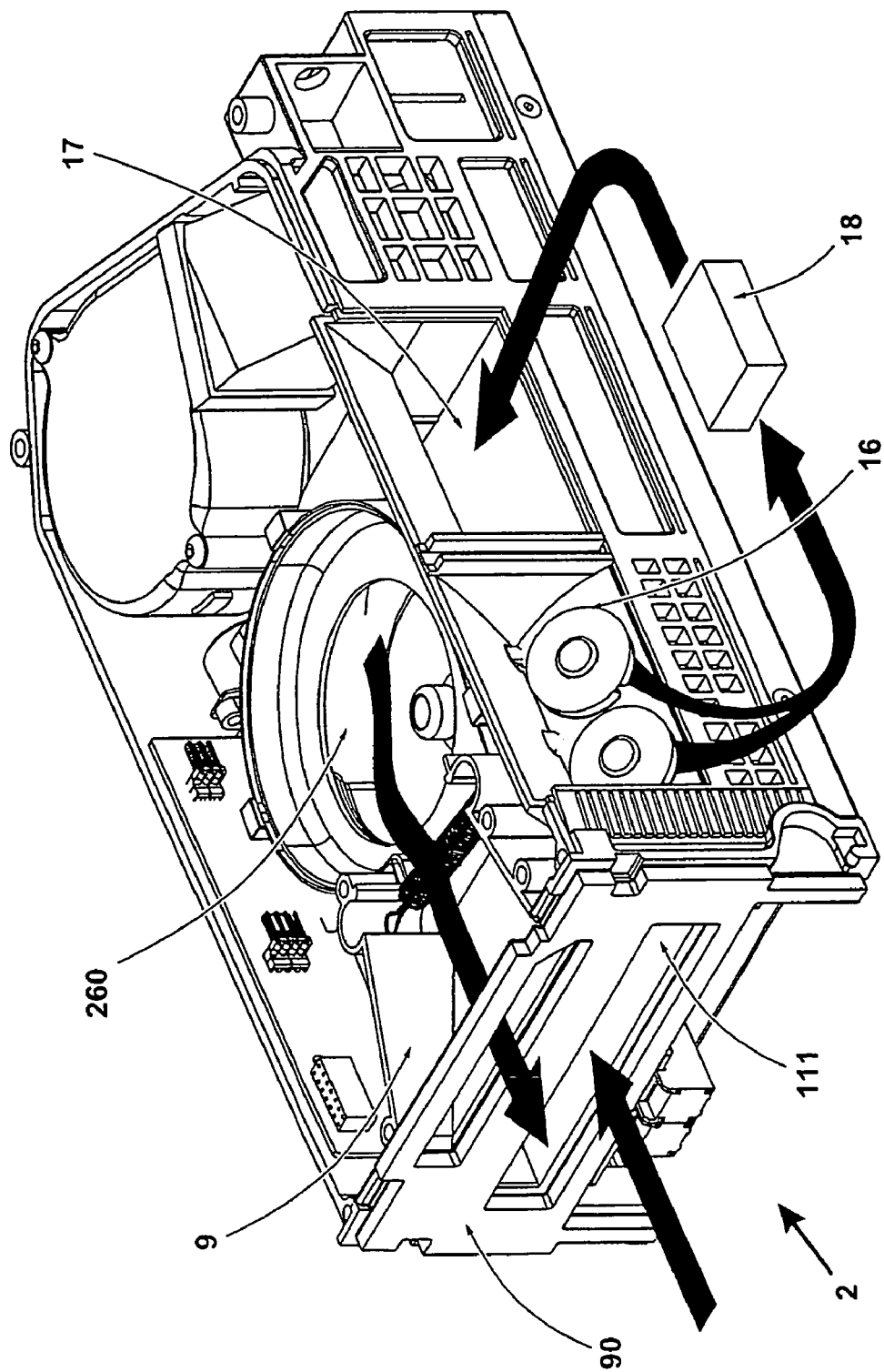
FIG. 4 is a view similar to that of FIG. 3 showing the connection of a heat exchanger for cooling purposes.

As schematically shown in FIG. 4, the heat exchanger 18 is fixed to the temperature control module 2 over the openings 16,17 in the side wall 15 so that air exiting the temperature control module 2 through the front opening 16 passes through the heat exchanger 18, where the air is cooled, and back into the temperature control module 2 via the rear opening 17.

Referring to FIG. 5, the carrier module 3 has the interface unit 8 at its rear, the interface unit 8 together with the upper wall 104 defining a slot-shaped opening 130 into the interface unit 8 for air from an associated temperature control module 3. Three generally rectangular apertures 131a–131c forming an air outlet are disposed across the centre line of the rear wall of the interface unit 8 so as to line up with the slot 111 of a temperature control module, which it will be recalled extracts air. The apertures 131a–131c comprise a central aperture 131a, which as will be described later herein conducts air which has passed over the top disk drive unit 102, and two side apertures 131b, 131c, which as will be later described herein conduct air that has passed over the lower disk drive unit 202. The central aperture 131a is disposed on and about a vertical axis of symmetry of the carrier module 3, and the side apertures 131b, 131c are disposed at the same level as the central aperture 131a, but to each side of it.

As best seen in FIGS. 1,2 and 5, each lever latch 7 has a lever member 71 pivotally secured via a pivot 72 to the lower rear edge of the carrier module 3. The lever member 71 can rotate freely on its pivot 72. The lever member has an elongate straight portion 73 which extends at one end into a curved portion 75 that contains a hole 106 for cooperation with the pivot 72 into a nose portion 74. The nose portion 74 is disposed in the plane of the straight portion 73 but transverse to the extent of the straight portion 73. The straight portion 73 is eccentric of the pivot 72. The straight portion 73 extends from the pivot 72 by about five times the extent of the nose portion 74, to give a mechanical advantage in use. The lever member 71 cooperates with a socket 76 on the lower front edge of the temperature control module 2. The socket 76 has a curved wall 77 extending to a downward-facing notch 78 for receiving the nose portion 74.

Figure 6:
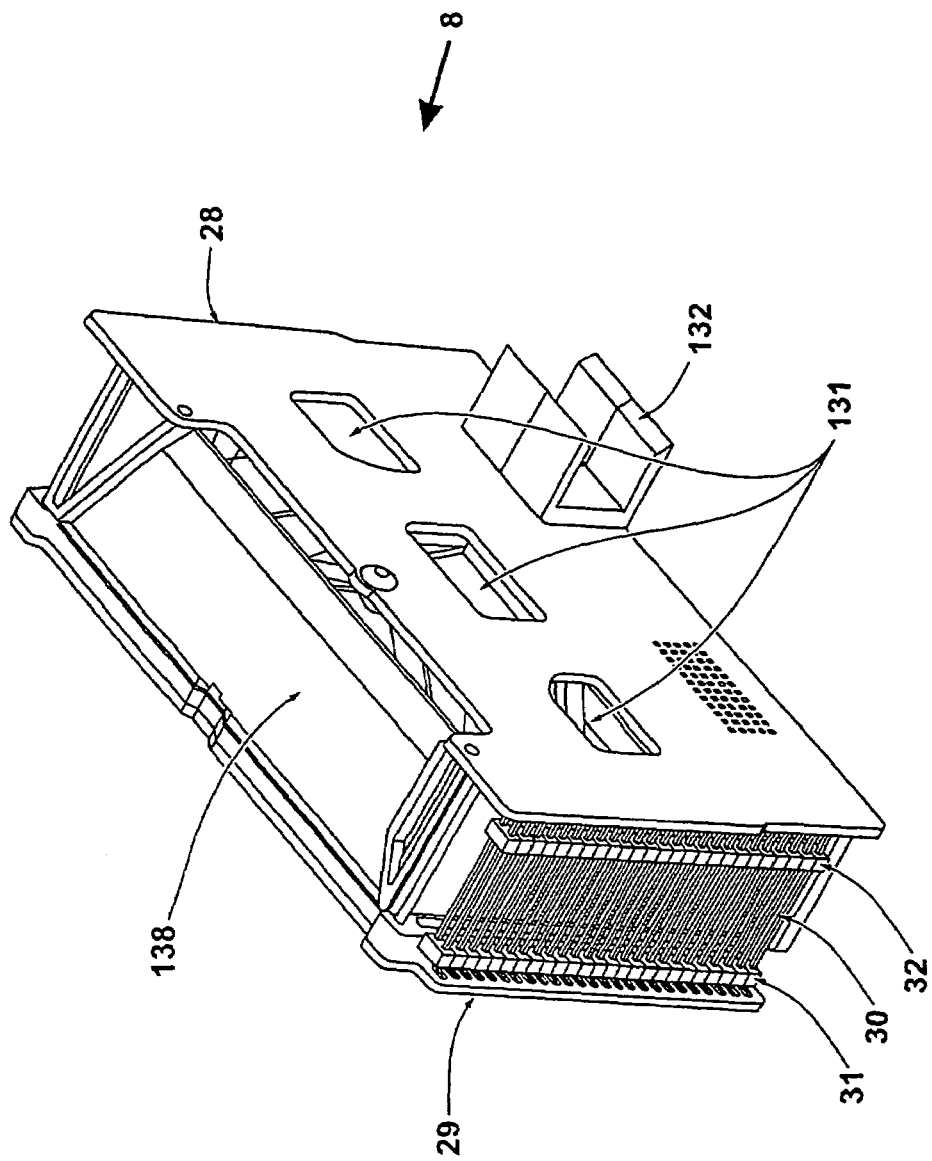
FIG. 6 is a perspective view of an example of an interface unit of the device of FIG. 1 shown from one side, being the side abutting the temperature control module.

Referring now to FIG. 6, the interface unit 8 is an assembly of first and second printed circuit boards 28, 29 spaced apart by a structure 138 which has the walls 138–145 that define air passages through the interface unit. Releasable electrical connection between the first and second printed circuit boards 28, 29 is made via a plug and socket arrangement 30 disposed between corresponding edges of the boards 28, 29. The plug device 31 projects from the second circuit board 29 and the plug device 32 is secured to the first printed circuit board 28. Where it is desirable to operate or test different types of disk drive unit each requiring a different type of second printed circuit board, the use of the plug and socket arrangement 30 enables easy interchange between the different types of second printed circuit board, providing each type is fitted with compatible plug devices 32. The first printed circuit 28 defines the apertures 131a–131c and part of the slot 130, and also has electrical connection devices 132 to allow electrical signals to be conveyed to and from disk drive units engaged with the second printed circuit board 29. The connection devices 132 in the described embodiment are plug-type devices that connect to the counterpart sockets 113 of the temperature control module 3.

Figure 7:
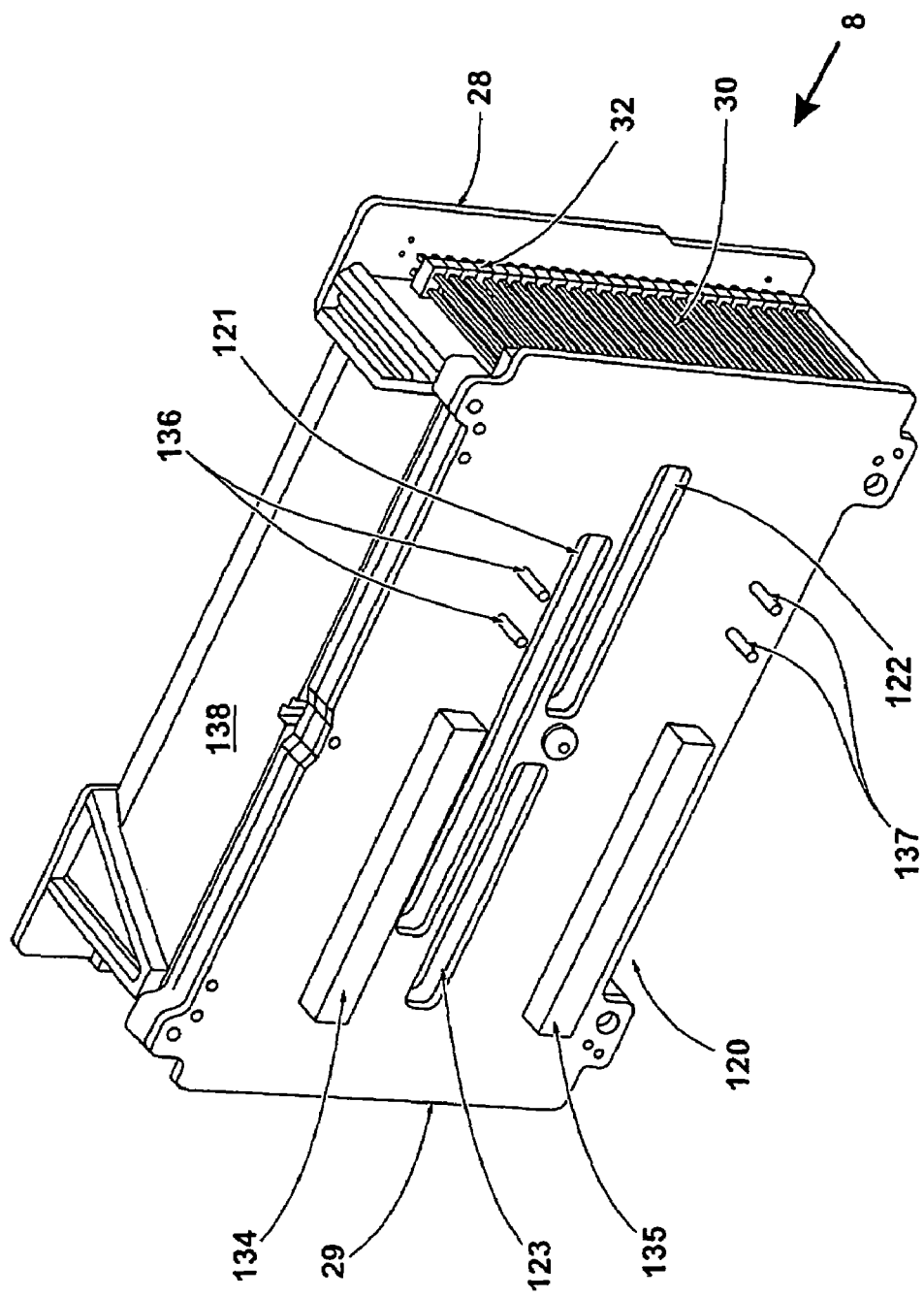
FIG. 7 is a perspective view of the interface unit of FIG. 6 shown from the other side, being the side for receiving the disk drive units.

Referring to FIG. 7, the front face of the second printed circuit board 29 defines the openings 108, 120-3 described previously herein with respect to FIG. 2. The second printed circuit board 29 also has two electrical sockets 134, 135, one above the other, for electrical connection of the disk drive units 102,202. First 136 and second 137 pairs of support pins are disposed approximately level with the sockets 134, 135 for supporting the disk drive units.

Figure 8:
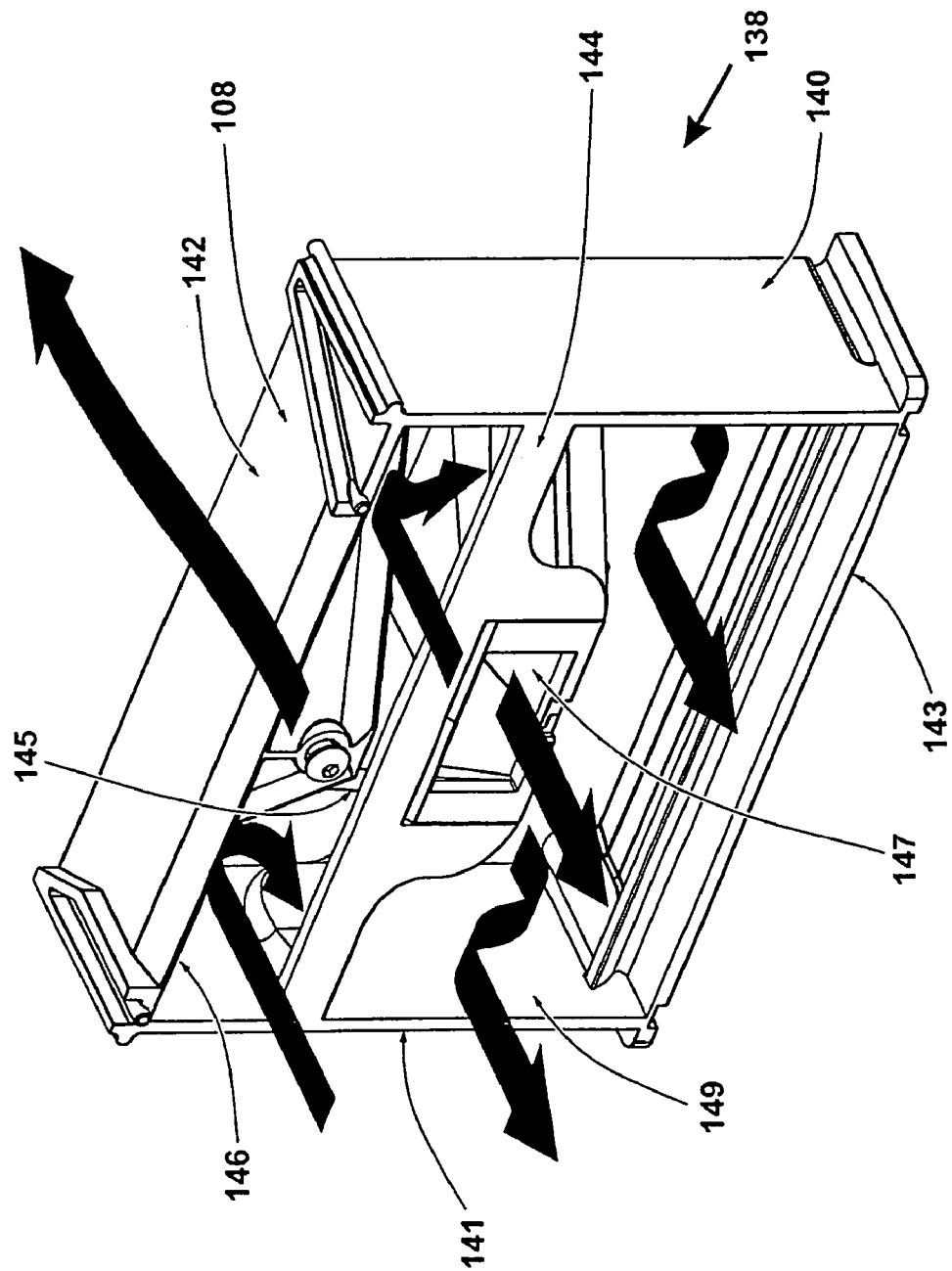
FIG. 8 is a cut-away view of the interface unit of FIG. 7 showing the air flow passages.

Referring now to FIG. 8, the structural member 138 consists of a generally rectangular frame having two opposing short side walls 140,141 and two opposing long cross walls 142,143. The top cross wall 142 is slightly inset from the top of the side walls 140,141, so as to form the first air delivery passage 108. It has a leading knife-edge 146 for splitting incoming air into two parts, one directed upwardly and one downwardly. A bridge piece 144 crosses the frame about one-third of the way down the side walls 140,141. The bridge piece 144 divides the frame into two parts, an upper part through which air has flows forwardly into the paper as shown, and a lower part through which air flows out of the paper as shown. The upper part has a V shaped deflecting wall 145 to direct the part of the air deflected downwardly by the knife edge 146 once again downwardly and out of the second and third slots 122,123. The wall of the bridge piece 144 is shaped so as evenly to distribute this air across the slots 122, 123.

The bridge piece 144 has a central passage 147 that directly connects the slot 120 with the centre aperture 131a. The bridge portion 144 also defines between itself and the lower cross wall 143 a chamber 149 which opens through the first printed circuit board 28 as outer apertures 131b, 131c and, through the second printed circuit board, as the slot 121. The shape of the bridge portion 144 and of the various apertures and walls is determined to give even flows across two identical disk drive units.

Figure 9A:
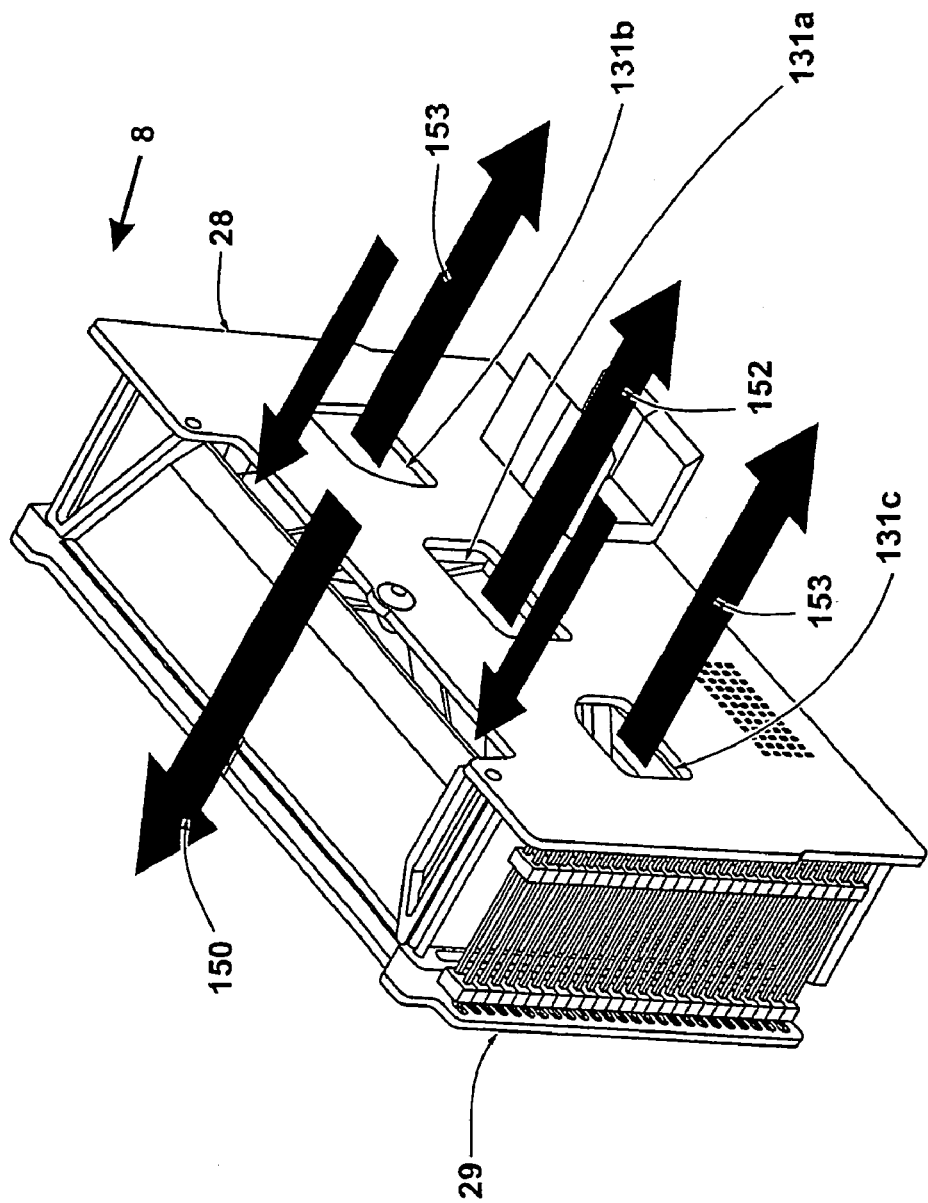
FIG. 9a shows the air flow from the interface unit from the temperature control module side.
Figure 9B:
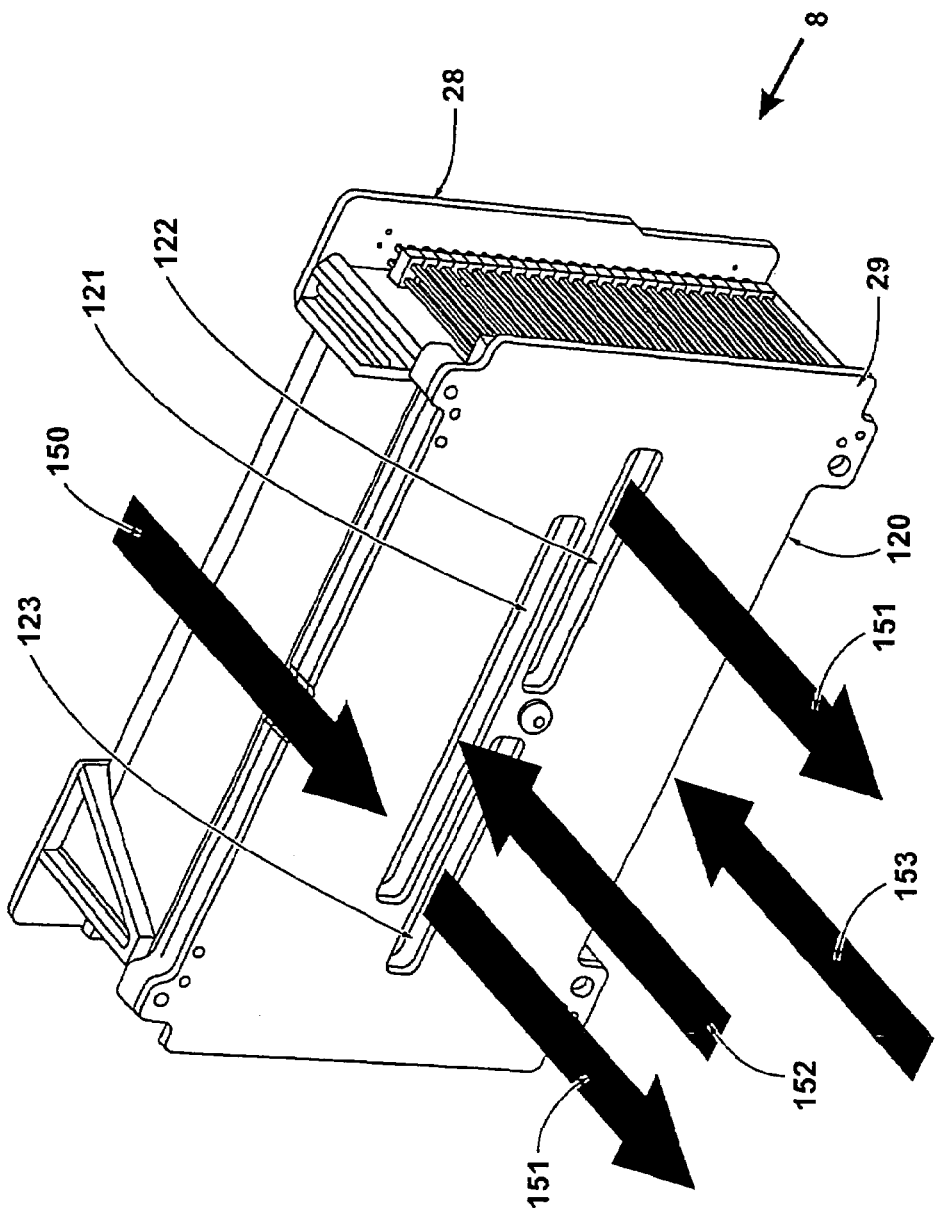
FIG. 9b shows the air flow from the interface unit from the carrier module side.

The flows are more clearly seen in FIGS. 9a and 9b. In these figures, flow to the upper disk drive unit is referenced 150, and that to the lower disk drive unit 151. The return flow from the upper disk drive unit is referenced 152, and from the lower disk drive unit 153. Referring again to FIG. 2 shows the flows with the two disk drive units 102,202 in place.

Typically, different types of disk drive unit will require one or both of different electrical sockets 134,135 and different air flow passages. This can be achieved by either changing the second printed circuit board alone, or by also changing the structural member 138 and the associated baffle.

Figure 10:
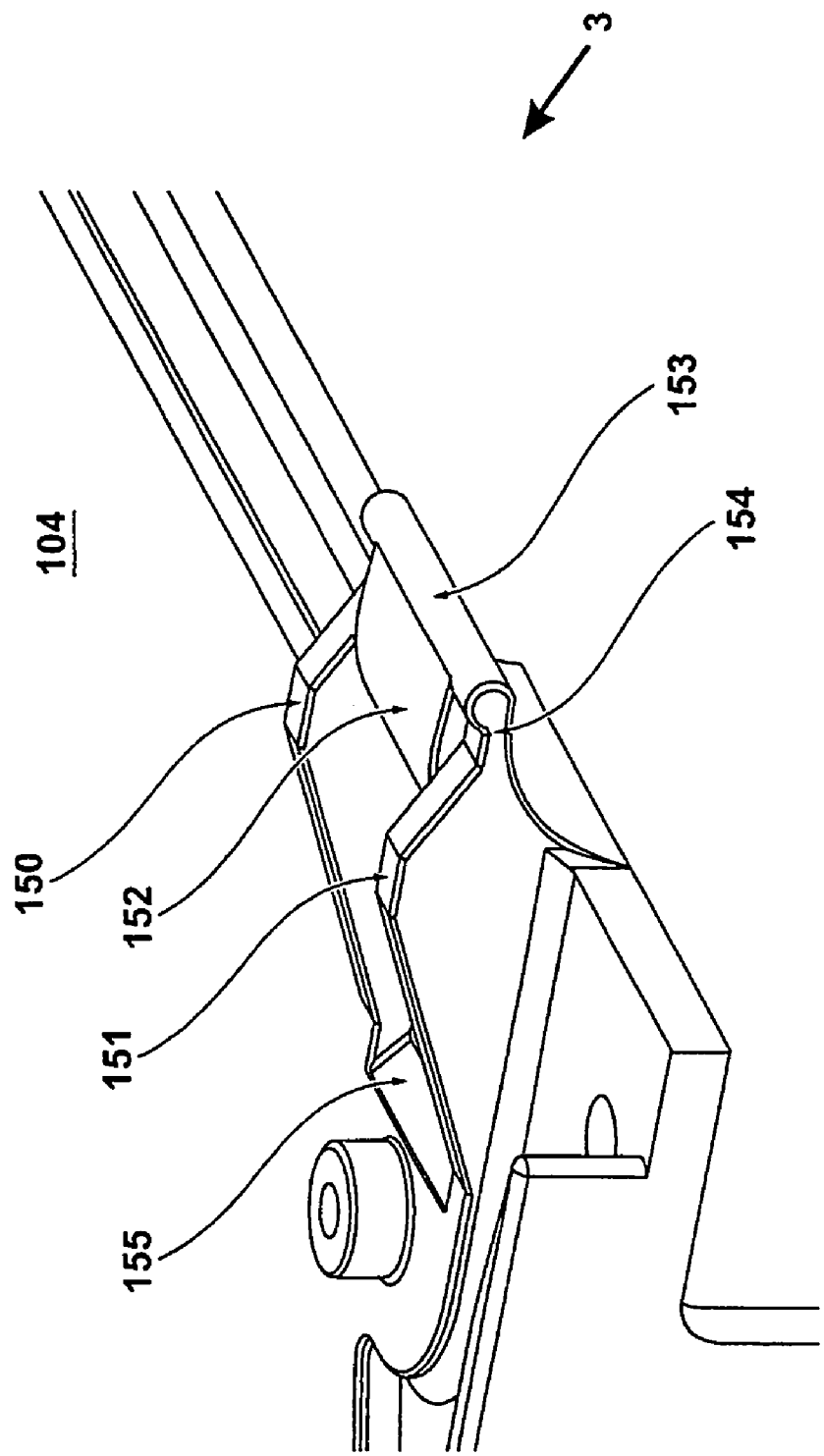
FIG. 10 is a partial view of the temperature control module of FIG. 1 showing the pin portion of a manual release hinge.

Turning now to FIG. 10, as has previously been mentioned, the top wall 104 of the carrier module 3 is generally planar, and has formations which form the pin portions 150-2 of manually released hinges 6a, 6b. Two side wall portions 150,151 stand up from the top wall 104 and project out from the edge of the top wall 104 to define a channel therebetween. The channel has a base wall 152 between the side wall portions 150,151 which rises from the top wall 104 and has a distal portion which is parallel to and raised from the top wall 104. The distal end of the base wall 152 extends into a pin portion 153, whose wall follows a circular-cylindrical contour. The pin portion 153 has a longitudinal axis at least substantially parallel to the plane of the top wall 104, and raised with respect to that plane. The distal ends of the side wall portions 150,151 extend via waist regions 154 into the pin portion 153, whose axial length is substantially the spacing between the side walls 150,151. The waist regions 154 are thinner than the base wall thickness and thus the pin wall extends angularly further around the pin portion 153 in the end regions of the pin portion 153 than in the central region. At the proximal end of the base wall 152, there is a slot 155 in the top wall 104 to allow insertion of the tension strap 170.

Referring now to FIG. 11, the receptacle portions 160-7 of the manually releasable hinges will now be described. The edge region 163 of the top wall 103 of the temperature control module 2 has walls 160,161 that stand perpendicularly up from the plane of the wall 103. The walls 160,161 are in positions along the temperature control module 2 which correspond to the position of the walls 150,151 of the pin portion 153 on the carrier module 3, and are spaced by substantially the same amount as the spacing of the walls 150,151. The top wall 103 forms a recess 164 in the edge. The recess 164 has a width for receiving the pin portion 153, and a surface 165 which has a first convex curved portion 166 extending into a circular concave portion 167. The convex curved portion is for leading a pin portion 153 into engagement with the circular concave portion 167 and extends from a start point at around half the thickness of the wall 103 to an end point inset further from the edge and below the top surface of the top wall 103 by around one third the wall thickness. The circular concave portion 167 extends from the end point by substantially 180 degrees to the surface of the top wall 103, so as to provide a pivot for the pin portion 153. The walls 160, 161 extend somewhat over the sides of the circular concave portion 167 at the level of the surface of the wall 104 to define housing notches which serve to prevent the pin portion from disengaging from the circular concave portion 167.

Inset from the edge 163 and beyond the walls 160, 161 an aperture 168 is formed in the top wall 103 for receiving the end of a tension strap 170.

Figure 12:
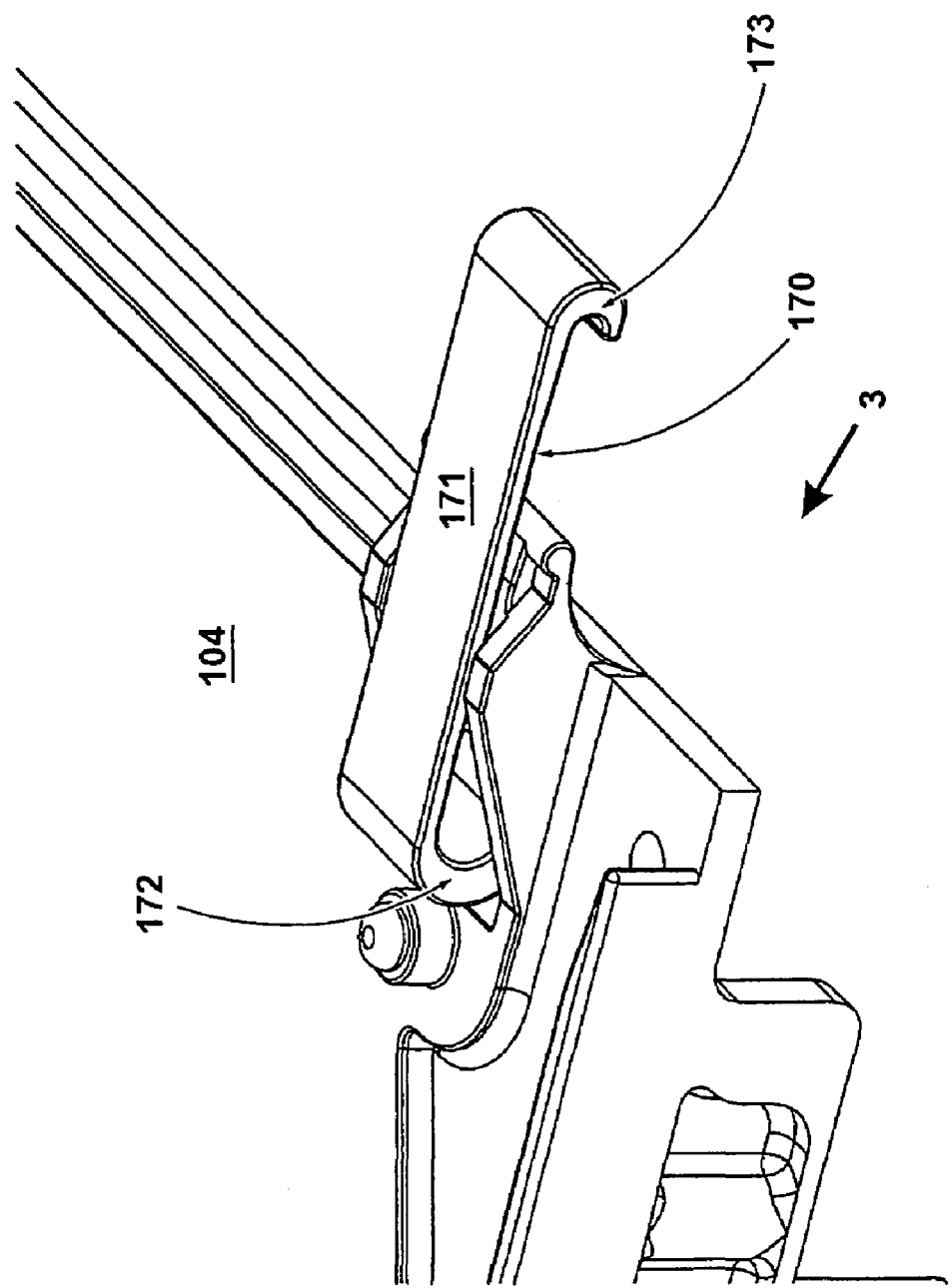
FIG. 12 is a partial view of the temperature control module of FIG. 1 showing the tension strap portion of the manual release hinge; and, FIG. 13 is a partial view of the temperature control module and carrier module of FIG. 1 showing an assembled manual release hinge.

FIG. 12 shows a tension strap 170 engaged in the slot 155 of the top wall 104 of the carrier module 3. The tension strap 170 is of plastics material, and consists of a thin straight bar portion 171 extending at a first end into a first hook portion 172 which engages in the slot 155. The other end of the bar portion of the tension strap extends into a second hook portion 173, which is more sharply radiussed than the first hook portion 172. The second hook portion 173 comes into a gripping engagement with the edge of the aperture 168 during rotation of the carrier module 3 as will be further described below. The strap 170 has a width for passing between the upstanding walls 150, 151 of the carrier module 3 and the walls 160, 161 of the temperature control module 3.

In the embodiment, the length of the pin portion 153 is such as to provide a sliding fit between the sides of the recess 164 and the tension strap width is such as to provide a sliding fit between the walls 150,151 and 160, 161. This ensures that the carrier module 3 and temperature control module 2 are self-aligned.

To assemble the temperature control and carrier modules 2,3 the temperature control module 2 is supported substantially vertically with the air output port 9 and air inlet port 111 facing up and the receptacle portions 160-167 of the manually-releasable hinges 6a, 6b towards the operator. The carrier module 3 is lowered more or less in line with the axis of the temperature control module 2 until the pin portions 150-4 of the manually-releasable hinges 6a, 6b engage with the hinge receptacle portions 160-7.

The carrier module 3 is then pivoted towards the operator until the tension straps 170 engage their slots 168. Next the carrier module 3 is rotated away from the operator until the latch lever members 71 are disposed with the noses 74 engaging in the notches 78. At this point the operator turns the latch lever members about their pivots 72 to pull the two modules 2,3 together. Once this is done the straight parts 73 of the levers are disposed within the envelope of the carrier module 3. The assembly of the two modules 2,3 is then secured to a base unit and extends substantially horizontally.

Figure 13:
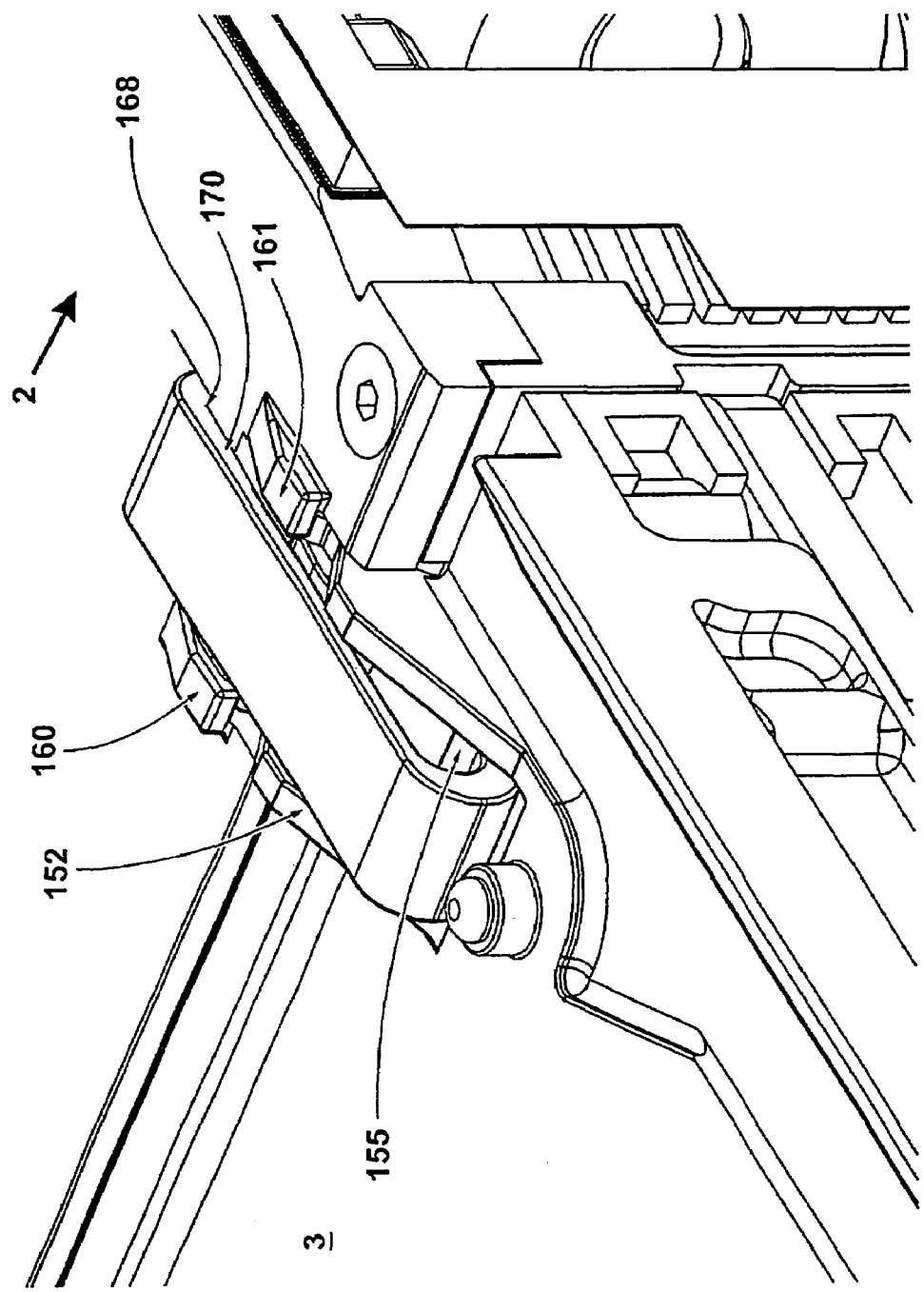

FIG. 13 shows the hinge and tension straps in the connected state. During this assembly process, the electrical connections between plugs 132 and sockets 113 are made, and due to the method of connection, substantially no side forces are exerted on the plugs or sockets. Once the assembly is completed, the air inlet 111 and outlet 9 of the temperature control module 2 and the apertures 131a–131c and slot 130 of the carrier module 3 are aligned in register with one another. The wall around the inlet and outlet of the temperature control module 2 and the wall around the apertures 131a–131c and slot 130 of the carrier module 3 are urged together by the action of the tension straps 170 and the lever latches 7 to prevent leakage of air. The connection between the two modules 2,3 is easily made and released, but once in the fastened state, the modules are secured together with a high degree of rigidity.

To mutually separate the two modules 2,3, the assembly is removed from the base unit and the operator then rotates the straight parts 73 of the lever latches, counterclockwise as seen in FIG. 1. The straight parts 73 move out of the envelope of the carrier module 3, and noses 74 are urged against the rear wall of the notches 78, to separate the two modules. This technique allows a controlled separation force to be exerted between the two modules while the hinge connection remains made.

In operation of the support device for testing, the disk drive units are typically operated with a range of different voltage levels, and at a range of different temperatures while monitoring drive performance. For some tests, the dissipation of the drive unit or units provides the heat needed, and for these tests the air flow is simply recirculated. Where higher temperatures are needed, the air at the output of the temperature control module 2 is heated by activating the heater coil 112. Where it is desired to operate at sub-ambient temperatures or temperatures below that achieved by direct recirculation, the air is fed through the cooling heat exchanger 18.

In the described embodiment, the embedded processor provides power supply conditioning to yield the different voltage levels, and provides control of the temperature regimes while monitoring performance. To do this, program data are loaded in from a main processor, and the embedded processor then needs to report only faults and exceptions.

Once a test run is completed on disk drive units 102,202 an automatic handler extracts the disk drive units 102,202 from the carrier module 3 and loads new drive units 102,202 for testing.

Embodiments of the present invention have been described with particular reference to the examples illustrated. However, it will be appreciated that variations and modifications may be made to the examples described within the scope of the present invention.

The invention claimed is:

1. A mounting device for a disk drive unit, the mounting device comprising:
   a carrier module constructed and arranged to receive at least one disk drive unit, the carrier module having an air input port, the carrier module being arranged to direct air from the air input port over a disk drive unit received in the carrier module;
   a temperature control module comprising an air flow control device, the temperature control module having an air output port; and,
   a releasable fastener for releasably fastening the carrier module to the temperature control module with the air input port of the carrier module in register with the air output port of the temperature control module,
   wherein the temperature control module is arranged to provide air to said air input port for controlling the temperature of a said disk drive unit received in the carrier module to be at a predetermined temperature during operation of the disk drive unit.

2. A mounting device according to claim 1, wherein the carrier module has an air outlet port and the temperature control module has an air inlet port, the arrangement being such that when the releasable fastener fastens the carrier module to the temperature control module the air outlet port of the carrier module is in register width with the air inlet port of the temperature control module.

3. A mounting device according to claim 2, wherein the temperature control module has a fan and is arranged to recirculate air from the air outlet port of the carrier module to the air output port of the temperature control module.

4. A mounting device according to claim 1, wherein the releasable fastener comprises a manually releasable hinge pivotally connecting the carrier module and the temperature control module along one edge of the carrier module and the temperature control module and a lever latch for securing the carrier module to the temperature control module along an edge of the carrier module and temperature control module opposite the said one edge.

5. A mounting device according to claim 4, wherein the manually releasable hinge has a pin portion, a receptacle portion and a hook member, the pin portion being secured to and supported substantially parallel to and spaced from a wall of one of said the carrier module and temperature control module, the receptacle portion being formed on the other of the carrier module and the temperature control module, the receptacle portion being constructed and arranged to engage said pin portion, the receptacle portion having a curved wall for abutment by the pin portion and the receptacle formation defining an opening such that the pin portion may be brought into engagement with the curved wall of the receptacle portion via the opening, and the hook member being constructed and arranged to engage the carrier module and the temperature control module to retain the pin portion in engagement with the curved wall of the receptacle portion.

6. A mounting device according to claim 1, wherein the carrier module is constructed and arranged to simultaneously receive plural disk drive units.

7. A mounting device according to claim 6, comprising air flow passages arranged to divide air flow from the output port of the temperature control module for application to each of plural disk drive units received in the carrier module.

8. A mounting device according to claim 6, having air flow passages arranged to combine the air flow from each of plural disk drive units received in the carrier module to provide a single air flow from the carrier module.

9. A mounting device according to claim 7, wherein the passages are arranged to divide the air flow such that air flows in the same direction around each disk drive unit.

10. A mounting device according to claim 7, comprising a baffle that provides said air flow passages, the baffle having a first side having at least one opening for receiving an incoming air flow from the temperature control module, and a second side having plural openings for supplying air to each of plural disk drive units received in the carrier module, the baffle having a deflection structure constructed and arranged to divide the incoming air flow between said plural disk drive units.

11. A mounting device according to claim 10, wherein the second side of the baffle has plural further openings for receiving air from that has flowed over plural disk drive units received in the carrier module, and the first side of the baffle has at least one opening for passing said air to the temperature control module.

12. A mounting device for disk drive units according to claim 11, wherein at said second side of said baffle, said openings and said further openings are interleaved, whereby each of the plural disk drive units has a similar flow of air.

13. A mounting device for disk drive units according to claim 1, wherein the temperature control module has an electrical connection device, the carrier module has a first electrical connector for engaging a disk drive unit received in the carrier module, and the carrier module has a second electrical connector arranged to engage the electrical connection device of the temperature control module when the temperature control module and the carrier module are fastened together.

14. A mounting device for disk drive units according to claim 1, wherein the temperature control module has an electrical connection device, and the carrier module has plural first electrical connectors for engaging respective disk drive units received in the carrier module and a second electrical connector arranged to engage the electrical connection device of the temperature control module when the temperature control module and the carrier module are fastened together.

15. A method of testing a disk drive unit in a test device comprising a temperature control module and a carrier module constructed and arranged to support said disk drive unit, wherein the carrier module has an air input port and is arranged to direct air from the air input port over a said disk drive unit received in the carrier module and the temperature control module comprises an air flow control device and has an air output port, the method comprising:
releasably fastening the carrier module to the temperature control module, such that the air input port of the carrier module is in register with the air output port of the temperature control module;
disposing said disk drive unit in said carrier module; and, causing the temperature control module to provide air to said air input port to control the temperature of said disk drive unit disposed in the carrier module to be at a predetermined temperature during operation of the disk drive unit.

16. A method of testing a disk drive unit according to claim 15, comprising the step of controlling the flow of air across the disk drive unit to cause air to recirculate directly across the disk drive unit, or to cause chilled air obtained by passing at least a portion of the air that has passed over the disk drive unit through a heat exchanger to flow across the disk drive unit, or to cause a mixture of directly recirculating air and chilled air to flow across the disk drive unit.

17. A method of testing a disk drive unit according to claim 15, wherein the temperature control module and the carrier module each have a respective part of a manual release hinge and the step of releasably fastening comprises engaging the two parts of the hinge, mutually pivotally moving the carrier module and the temperature control module until they abut one another and securing the carrier module to the temperature control module via a lever latch.

18. method of testing a disk drive unit according to claim 15, wherein the carrier module has locations constructed and arranged to simultaneously receive plural disk drive units, and the disposing step comprises disposing at least two disk drive units in respective ones of said locations.

19. A method of testing a disk drive unit according to claim 15, comprising dividing air flow from the outlet of the temperature control module and applying a part of said divided air flow to each of plural disk drive units received in the carrier module, and combining the air flow from each of the disk drive units to provide said outlet from the carrier module.

20. A method of testing a disk drive unit according to claim 19, wherein the dividing step comprises dividing the air flow such that it flows in the same direction around each disk drive unit.

21. A method of testing a disk drive unit according to claim 15, comprising providing plural types of carrier module, each type of module being suitable for a respective one of plural different types of disk drive unit.

22. A method of testing a disk drive unit according to claim 15, wherein the temperature control module has an electrical connection device, the carrier module has a first electrical connector secured thereto for engaging a disk drive unit received in the carrier module, and a second electrical connector arranged to engage the electrical connection device of the temperature control module when the temperature control module and the carrier module are secured together, and said step of disposing comprises connecting the electrical connection device of the disk drive unit to said first electrical connector.

23. A method of testing a disk drive unit according to claim 22, wherein each of said different types of disk drive unit has an electrical connection device which is at least one of differently disposed or differently configured to electrical connection devices of others of said types of disk drive units, the temperature control module has an electrical connection device, each type of carrier module has a respective first electrical connector secured thereto for engaging the electrical connection device of the corresponding type of disk drive unit received in the carrier module, and a second electrical connector arranged to engage the electrical connection device of the temperature control module when the temperature control module and the carrier module are secured together, and said step of disposing comprises connecting the electrical connection device of the disk drive unit to said first electrical connector.

* * * * *